L. BLACHER & S. SZTENCEL.
PROCESS OF CONCENTRATING AND PURIFYING SLUDGE ACID.
APPLICATION FILED JULY 19, 1909.
956,276.
Patented Apr. 26, 1910.
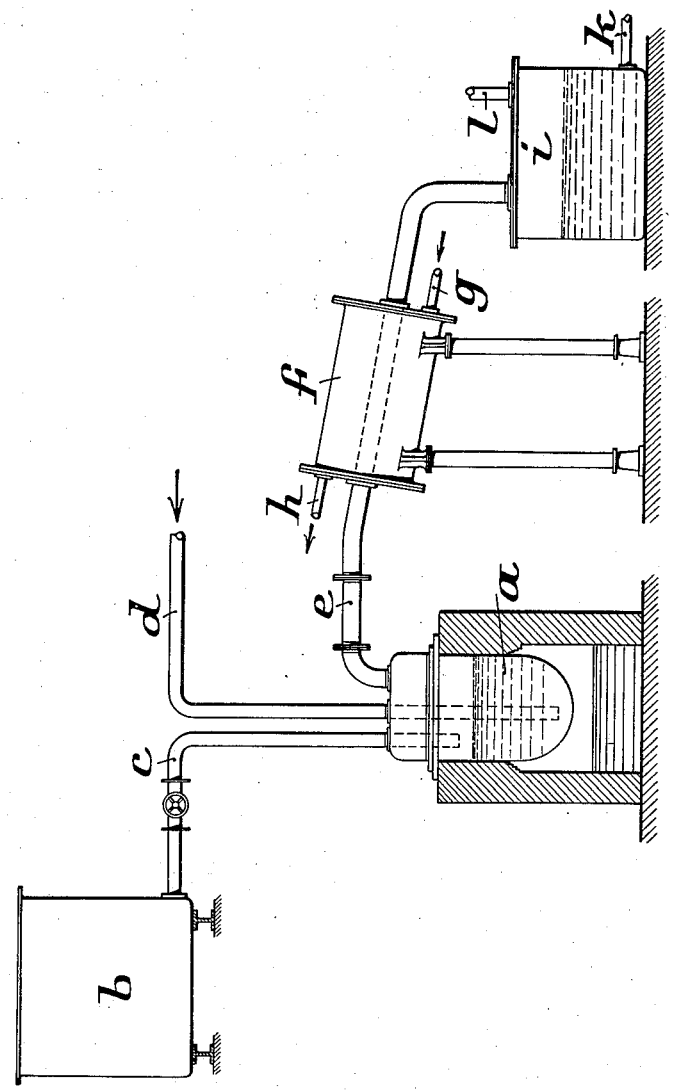

UNITED STATES PATENT OFFICE.

LEOPOLD BLACHER AND STANISLAUS SZTENCEL, OF CAMPINA, ROUMANIA.

PROCESS OF CONCENTRATING AND PURIFYING SLUDGE-ACID.

956,276.  Specification of Letters Patent.  Patented Apr. 26, 1910.

Application filed July 19, 1909. Serial No. 508,325.

*To all whom it may concern:*

Be it known that we, LEOPOLD BLACHER, manager, a subject of the Emperor of Russia, and STANISLAUS SZTENCEL, engineer, a subject of the Emperor of Austria-Hungary, residing at Campina, Roumania, have invented certain new and useful Improvements in Processes of Concentrating and Purifying Sludge-Acid; and we do hereby declare the following to be a full, clear, and exact description of the invention, such as will enable others skilled in the art to which it appertains to make and use the same.

The waste acid resulting from the purification of mineral oils, which has been regenerated in the usual manner by addition of water, still contains up to 2.5% organic substances of complicated nature, which give to the acid a dark color. This "black-acid" is a product of little value, as it cannot be used for many purposes, and even in the purification of mineral oils it is not equivalent to pure acid. The impurities contained in the acid may be partly destroyed by heating, the organic substances being totally decomposed at a higher temperature, and separating from the acid in form of asphalt or graphite. Till now however, it has not been possible to purify the acid altogether by heating alone. We have now found, that by treating the acid to the oxidizing action of air, the organic substances may be easily converted into carbonic acid and eliminated. This discovery is utilized for the regeneration of black acid by the present process.

The accompanying drawing represents a sectional side elevation of one form of apparatus employed in carrying out the improved process.

According to the present process pure concentrated sulfuric acid is heated to boiling point in a suitable boiler $a$, and the black acid run in continuously from the vessel $b$ through pipe $c$. At the same time a current of air is blown by means of the pipe $d$ into the mixed acids contained in the boiler $a$. Practically pure sulfuric acid distils over through pipe $e$ and is condensed by the condenser $f$, in which water enters through pipe $g$ and flows out through the outlet $h$. The condensed acid is collected in the vessel $i$ from which it may be withdrawn by pipe $k$.

$l$ is a pipe through which the air and other gases escape.

The quantity of black acid run in in a given time is so regulated, that the temperature in the boiler remains constant at substantially the boiling point of sulfuric acid. From this point the process may be carried on continuously, the presence of the pure sulfuric acid being necessary only to start the reaction, which is continued by the oxidizing influence of the air current.

Our process may be carried out either with the diluted "black acid" directly, or after previously concentrating it in the usual manner. In case diluted acid is used, the oxidized acid may be concentrated after condensation.

We claim:—

The process herein described of obtaining practically pure sulfuric acid from sludge acid, consisting in running the waste acid into a suitable boiler containing concentrated sulfuric acid heated to boiling point, blowing a current of air through said acid, and condensing the vapors escaping from the boiler by the usual means.

In testimony, that we claim the foregoing as our invention, we have signed our names in presence of two subscribing witnesses.

LEOPOLD BLACHER.
STANISLAUS SZTENCEL.

Witnesses:
GERHARD BERGER,
F. W. KRAFT.